(12) United States Patent
Yamada

(10) Patent No.: US 10,303,407 B2
(45) Date of Patent: May 28, 2019

(54) IMAGE FORMING APPARATUS, METHOD OF CONTROLLING THE SAME, AND STORAGE MEDIUM

(71) Applicant: CANON KABUSHIKI KAISHA, Tokyo (JP)

(72) Inventor: Tetsuya Yamada, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/019,867

(22) Filed: Jun. 27, 2018

(65) Prior Publication Data
US 2019/0004752 A1 Jan. 3, 2019

(30) Foreign Application Priority Data
Jul. 3, 2017 (JP) .................................. 2017-130522

(51) Int. Cl.
| | |
|---|---|
| G06F 3/12 | (2006.01) |
| H04N 1/00 | (2006.01) |
| H04N 1/44 | (2006.01) |
| G06F 21/30 | (2013.01) |
| G06F 21/60 | (2013.01) |

(52) U.S. Cl.
CPC .......... *G06F 3/1238* (2013.01); *G06F 3/1222* (2013.01); *G06F 3/1239* (2013.01); *G06F 3/1255* (2013.01); *G06F 3/1267* (2013.01); *G06F 3/1286* (2013.01); *G06F 21/30* (2013.01); *G06F 21/608* (2013.01); *H04N 1/00854* (2013.01); *H04N 1/4413* (2013.01)

(58) Field of Classification Search
CPC combination set(s) only.
See application file for complete search history.

(56) References Cited

U.S. PATENT DOCUMENTS

| | | | |
|---|---|---|---|
| 8,355,148 | B2 | 1/2013 | Yamada et al. |
| 9,892,243 | B2 | 2/2018 | Yamada |
| 9,954,867 | B1* | 4/2018 | Johansson ............. H04L 63/102 |
| 2012/0005579 | A1 | 1/2012 | Yamada |
| 2013/0027428 | A1* | 1/2013 | Graham .................. H04L 51/32 |
| | | | 345/633 |
| 2018/0060004 | A1* | 3/2018 | Watanabe ............. G06F 3/1205 |
| 2018/0254904 | A1* | 9/2018 | Hwang ................. H04L 9/0863 |

FOREIGN PATENT DOCUMENTS

JP     2012254618 A    12/2012

* cited by examiner

*Primary Examiner* — Helen Zong
(74) *Attorney, Agent, or Firm* — Venable LLP

(57) ABSTRACT

An image forming apparatus and a method of controlling the same, wherein stored user information is referenced to perform authentication of a user based on accepted user information, and the user is allowed to confirm whether or not to reset the user information of the user when authentication of the user fails. The user is caused to select a reset method for resetting the user information of the user in accordance with the confirmation, and reset the stored user information of the user in accordance with the selected reset method.

8 Claims, 10 Drawing Sheets

FIG. 4

| 401 | 402 | 403 | 404 | 405 | 406 | 407 |
|---|---|---|---|---|---|---|
| uid | domain | PC NAME | SECRET NUMBER | PASSWORD | e-mail | REGISTRATION METHOD |
| tanaka | xxxx | pc1 | ****** | **** | tanaka@xxx.com | manual |
| kikuchi | xxxx | pc2 | ****** | **** | kikuchi@xxx.com | auto |
| suzuki | xxx-mj | pc3 | ****** | **** | suzuki@xxx.com | auto |

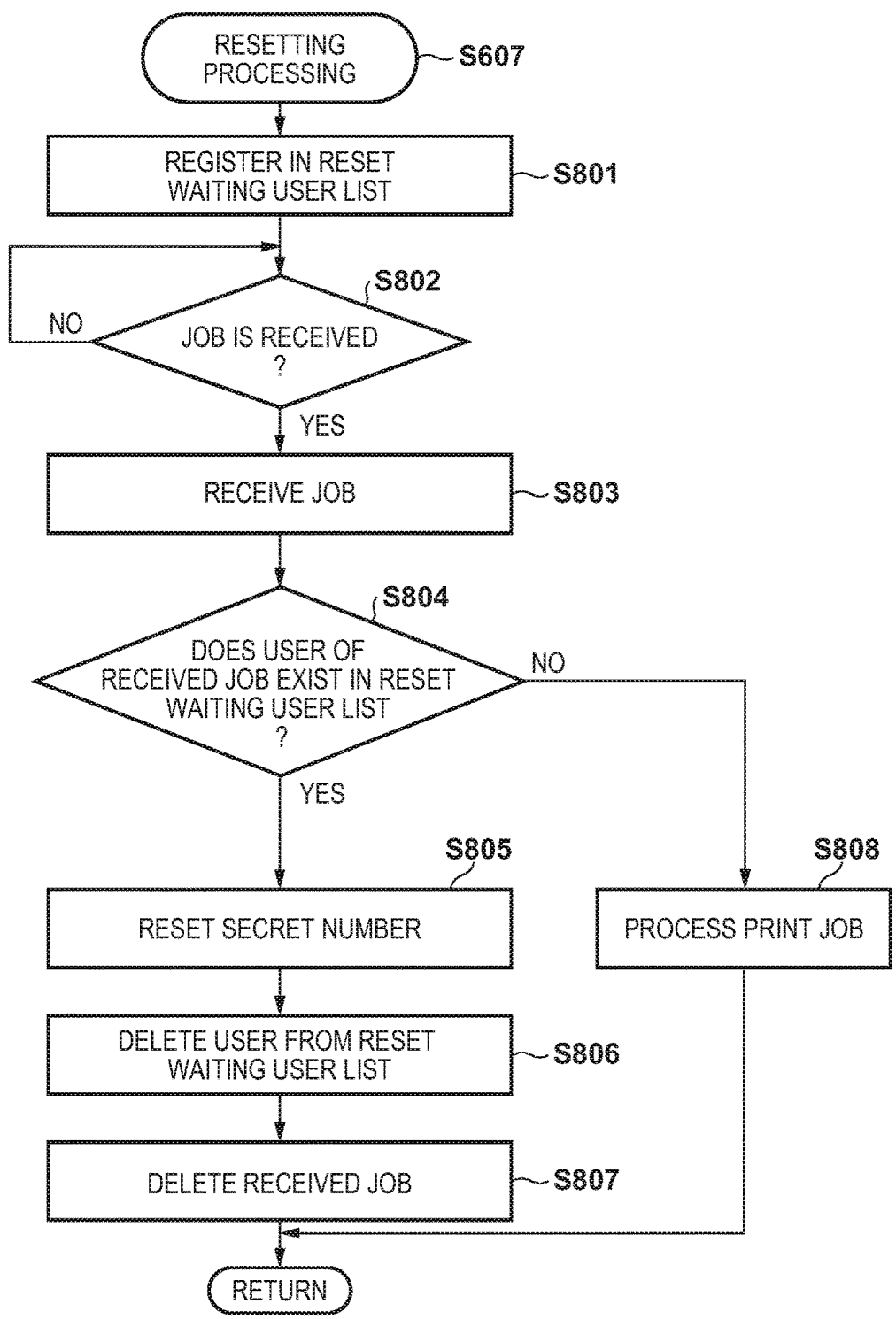

FIG. 10

| AUTHENTICATION SETTING | |
|---|---|
| SIMPLE LOGIN | |

AUTHENTICATION DESTINATION:    1001    LOCAL DEVICE

USER REGISTRATION METHOD:
- ☐ AUTOMATICALLY REGISTER AT TIME OF JOB INPUT
- ■ INCLUDE DOMAIN NAME IN USER NAME TO REGISTER
- ■ INCLUDE COMPUTER NAME IN USER NAME TO REGISTER
- ☑ MANUALLY REGISTER FROM SETTING MENU
- ☑ USER WHOSE ROLE IS Administrator
- ☑ Administrator

DISPLAY FOR ADMINISTRATOR USER:    [ NAME ORDER ]    ☑

CHANGE DEFAULT DISPLAY FOR SIMPLE LOGIN SCREEN:    [ E-MAIL TRANSMISSION SETTINGS... ]

- ☐ MUST USE SECRET NUMBER
- ■ PERMIT RESET OF SECRET NUMBER IN ACCORDANCE WITH JOB INPUT    1002
- ☐ PERMIT RESET OF SECRET NUMBER AND EMAIL NOTIFICATION

IMAGE FORMING APPARATUS, METHOD OF CONTROLLING THE SAME, AND STORAGE MEDIUM

BACKGROUND OF THE INVENTION

Field of the Invention

The present invention relates to an image forming apparatus, a method of controlling the same, and a storage medium.

Description of the Related Art

An MFP (Multifunction Peripheral) provided with a scanner, a printer engine, and a communication function and having an application that can execute, for example, copying, printing, and transmission of image data obtained by scanning an original is known. Because such an MFP is used by a plurality of users, there are MFPs that are provided with a user authentication function in order to restrict, for each user authenticated by an MFP, functions of the MFP that a user can use.

For example, Japanese Patent Laid-Open No. 2012-254618 discloses an image forming apparatus provided with a login function for allowing a user selected from a screen for selecting a user to log in to the image forming apparatus. Japanese Patent Laid-Open No. 2012-254618 recites, as a user management method that does not depend on an administrator, a method for using job owner information (user information) added to a print job received from a PC to automatically register the user to the image forming apparatus.

For example, in a case where a password is used in user authentication in an image forming apparatus, when a user forgets the password, the user ceases to be able to log in to and use the image forming apparatus. In such a case, the user needs to contact an administrator and have the administrator reset the user's password. However, when a correct password is unable to be input or reset of the password cannot be performed due to a reason such as an administrator being uncontactable, time that the user is unable to user the image forming apparatus lengthens.

SUMMARY OF THE INVENTION

An aspect of the present invention is to eliminate the above-mentioned problem with conventional technology.

A feature of the present invention is to provide a technique that allows user information necessary for authentication to be reset without the intervention of an administrator, even in the case where a user cannot obtain the user information which is necessary for authentication.

According to a first aspect of the present invention, there is provided an image forming apparatus, comprising: a storage that stores user information; a memory device that stores a set of instructions; and at least one processor that executes the instructions stored in the memory device to: perform an authentication of a user based on accepted user information, with reference to the user information stored in the storage; allow a user to confirm whether or not to reset the user information of the user in a case where the authentication of the user fails; allow the user to select a reset method for resetting the user information of the user in accordance with confirmation by the user; and reset the user information, stored in the storage, of the user in accordance with the selected reset method.

According to a second aspect of the present invention, there is provided a method of controlling an image forming apparatus having a storage operable to store user information, the method comprising: performing an authentication of a user based on accepted user information, with reference to the user information stored in the storage; allowing a user to confirm whether or not to reset the user information of the user in a case where the authentication of the user fails; allowing the user to select a reset method for resetting the user information of the user in accordance with the confirmation; and resetting user information of the user stored in the storage in accordance with the selected reset method.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 depicts a view for describing an example of a table for storing user information that is managed by a user authentication module of the MFP according to the embodiment.

FIG. 8 is a flowchart for describing processing for resetting (step S607) a secret number in the case where "reset in accordance with input of print job" is selected as a reset method for the secret number, in the MFP according to the embodiment.

FIG. 10 depicts a view illustrating an example of a setting screen for setting whether to enable or disable automatic registration of user information in accordance with job input.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
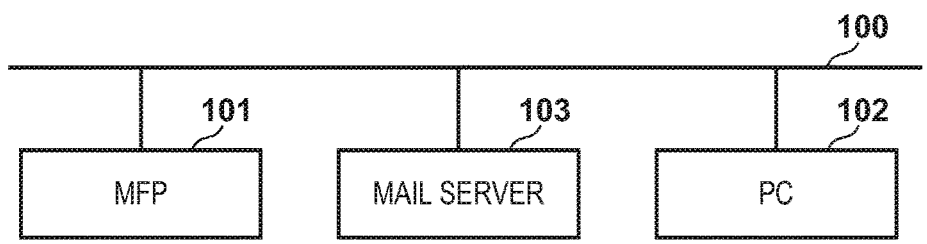
FIG. 1 depicts a view for describing an overall configuration of a system according to an embodiment of the present invention.

FIG. 1 depicts a view for describing an overall configuration of a system according to the embodiment of the present invention.

The system has an MFP 101 which is an image forming apparatus, a PC 102, and a mail server 103 that are connected to a LAN 100. Note that illustration is given only for equipment related to description of embodiments, but a plurality of PCs, servers, and the like are also connected to the LAN 100. The PC 102 transmits a print job to the MFP 101. In addition, the mail server 103 is a server that is necessary for transmission and reception of email.

Figure 2:
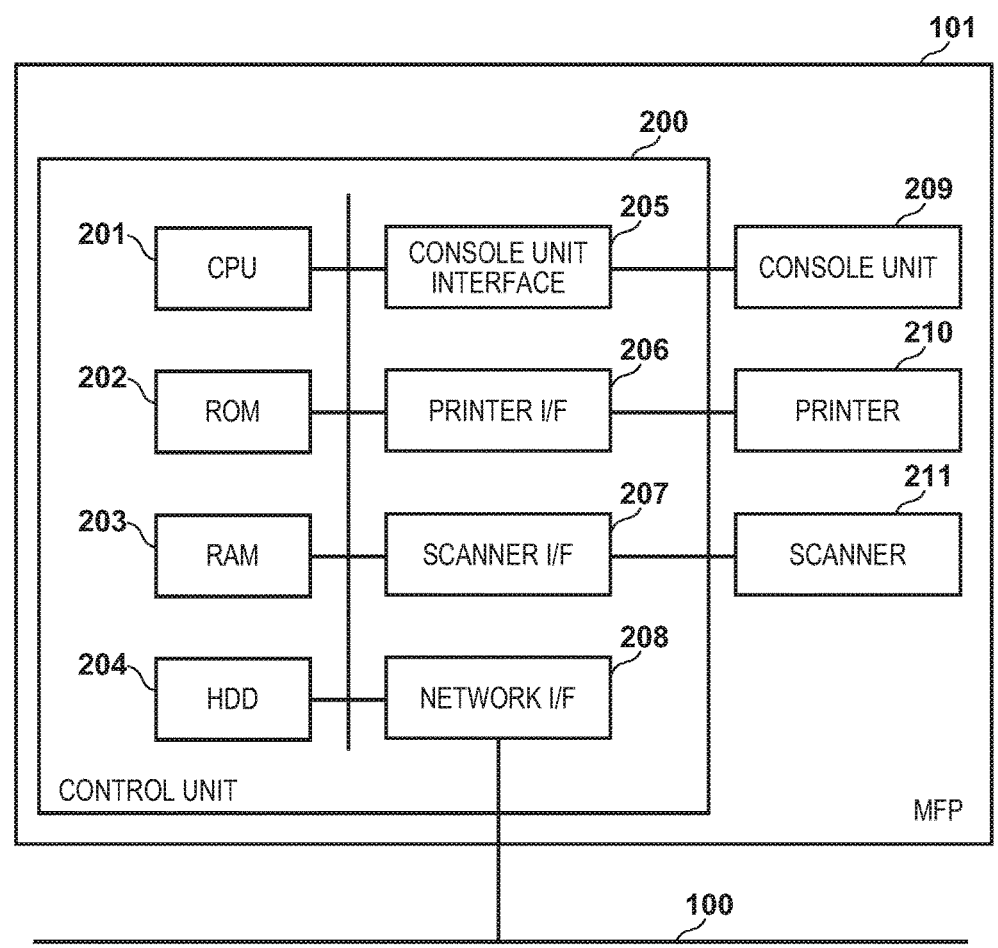
FIG. 2 is a block diagram for describing a hardware configuration of an MFP according to the embodiment.

FIG. 2 is a block diagram for describing a hardware configuration of the MFP 101 according to the embodiment. Description is given regarding an example of the MFP 101 in the present embodiment, but the MFP 101 may be an image forming apparatus such as an SFP (Single Function Peripheral) that has a single function such as a copy function or a scanning function.

A CPU 201 of a control unit 200 controls operation of the MFP 101 as a whole. The CPU 201 executes a boot program stored in a ROM 202, and deploys a program stored in an HDD 204 into a RAM 203. The RAM 203 is used as a temporary storage unit such as a main memory or a work area for the CPU 201. The HDD (hard disk drive) 204 stores received print jobs, image data, and various kinds of programs. A console unit interface 205 connects the control unit 200 with a console unit 209. The console unit 209 has a display unit which has a touch panel function, and a key unit that has a plurality of physical keys. A printer I/F 206 connects a printer unit 210 and the control unit 200. Image data to be printed by the printer unit 210 is transferred to the printer unit 210 from the control unit 200 via the printer I/F 206, and is printed on a recording material (sheet) by the printer unit 210. A scanner I/F 207 connects a scanner 211 and the control unit 200. The scanner 211 generates image data by reading an image of an original, and supplies the image data to the control unit 200 via the scanner I/F 207. A network I/F 208 connects the control unit 200 (MFP 101) to the LAN 100. The network I/F 208 transmits and receives various pieces of information to and from an external apparatus on the LAN 100 (for example, receives a print job transmitted from the PC 102).

Figure 3:
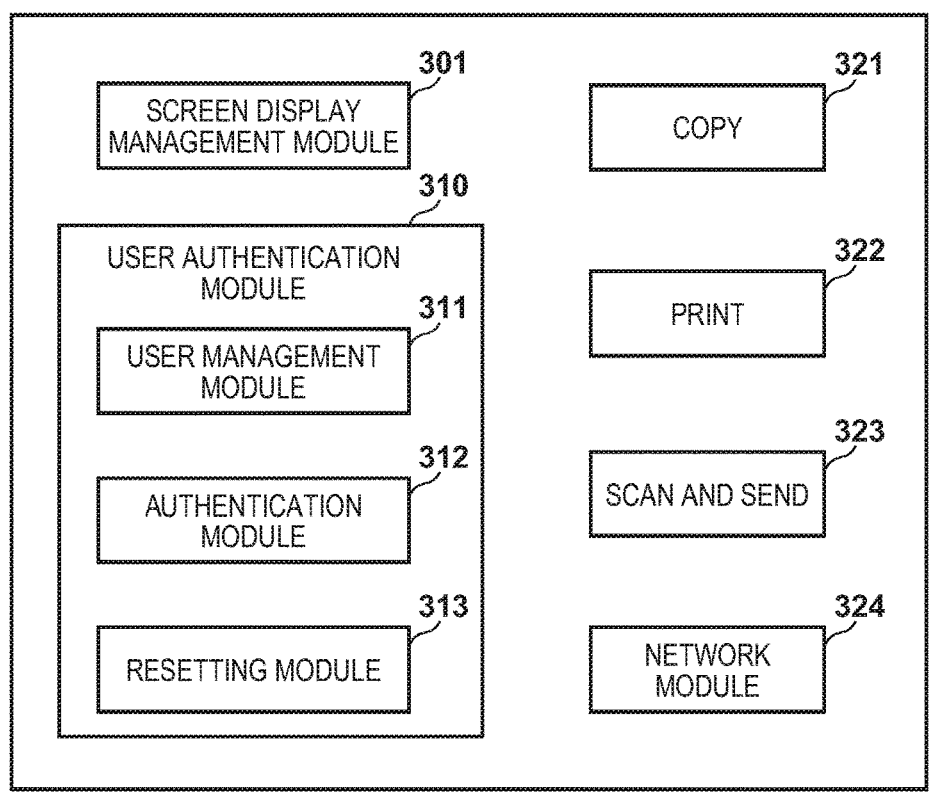
FIG. 3 is a functional block diagram for describing a software configuration of an MFP according to the embodiment.

FIG. 3 is a functional block diagram for describing a software configuration of the MFP 101 according to the embodiment. Functions illustrated in FIG. 3 are, as described above, realized by the CPU 201 executing programs deployed in the RAM 203.

A screen display management module 301 performs display control with respect to a display unit of the console unit 209. A network module 324 performs control for communicating, via the LAN 100, with the PC 102, the mail server 103, or the like. A user authentication module 310 realizes a user authentication function necessary for personalization, access control, and the like for a user who uses the MFP 101. As a consequence, it is provided with a user management module 311, an authentication module 312, and a resetting module 313. The user management module 311 manages user information.

The user authentication module 310 performs determination processing for determining whether or not a user who made a login request has authority for login to the MFP 101. However, configuration may be taken such that an external apparatus such as an authentication server obtains identification information from the MFP 101 and performs the determination processing, and the MFP 101 obtains a determination result from the external apparatus. In this embodiment, description is given regarding an example where the MFP 101 has a plurality of methods (functions) for identifying a user who is logging in. However, configuration may be taken such that the MFP 101 provides only a login method in accordance with a second method that is described later.

A first method is a method where the MFP 101 identifies a user who is logging in by the user causing an IC card reader/writer (not shown) to read information stored in an IC card of the user who is logging in.

Figure 7A:
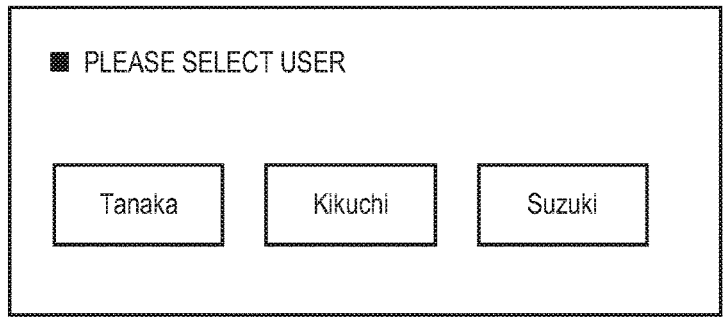
FIGS. 7A through 7D depict views illustrating examples of screens displayed on a display unit of a console unit of the MFP according to the embodiment.

The second method is a method where the MFP 101 identifies a user who is logging in by the user selecting the user who is logging in from a user selection screen displayed on the display unit. FIG. 7A illustrates an example of the user selection screen. Each icon illustrated in FIG. 7A corresponds to a user who is registered in the MFP 101. A user can make a login instruction to the MFP 101 by specifying an icon corresponding to themself. By the second method, a user can log in to the MFP 101 without using an IC card. Accordingly, with the second method, a user can log in to the MFP 101 in an easier fashion than with the first method.

A third method is a method for the MFP 101 to identify a user who is logging in by the MFP 101 obtaining identification information inputted by a user to a login screen that is displayed on the display unit of the MFP 101. In a case of inputting authentication information via the display unit of the MFP 101, a user can input identification information by operating the console unit 209.

The user authentication module 310 manages a list of pieces of identification information that correspond to users who can use the MFP 101, and determines whether to permit the login of a user based on at least whether or not information obtained in accordance with one of the methods described above is included in the list. Details of the list are described later with reference to FIG. 4.

Note that, in this embodiment, it is possible to set the MFP 101 so that, for a user to log into the MFP 101, the MFP 101 requests input of authentication information such as a password or a secret number associated with identification information of the user, and not only the identification information of the user.

In addition, in this embodiment, description was given for an example where a user operates the MFP 101 to execute login processing, but configuration may be taken such that a user operates a terminal device connected via a network to the MFP 101 to execute login processing. For example, configuration may be taken such that an input screen for identification information of the user is displayed on the terminal device, and the user logs in to the MFP 101 by inputting their identification information into the input screen displayed on the terminal device. In addition, configuration may also be taken such that a user logs in to the MFP 101 by causing an IC card reader connected to the terminal device to read card information of an IC card. In addition, configuration may be taken such that the user selection screen described above is displayed on the terminal device, and a user logs into the MFP 101 by making a selection in the terminal device.

Configuration may be taken so as to enable a function for both login by the first method and login by the second method, and enable a user to select which login method to use. In other words, it is possible to perform login processing by the first method when an IC card is touched to a card reader, and perform login processing by the second method when a user selection operation with respect to a user selection screen displayed on a display unit is made. Configuration may be taken so as perform authentication by an external authentication server in accordance with the first method described above even when both functions are enabled in this fashion, and perform login processing based on an authentication result from the authentication server.

FIG. 4 depicts a view for describing an example of a table for storing user information that is managed by the user authentication module 310 of the MFP 101 according to the embodiment.

A "uid" 401 is a user name for identifying a user. In the case of a domain environment, the user is identified by the "uid" 401 and a "domain" 402. In the case of a work group environment, a user is uniquely identified by combining the "uid" 401 and a "PC name" 403. A "secret number" 404 and a "password" 405 are both character strings that only the user knows that are necessary for authentication of the user. Here, the "secret number" 404 is used when the user uses the MFP 101 via the console unit 209, and the "password" 405 is used when the user uses the MFP 101 via a network. Below, the "secret number" and the "password" are collectively referred to as authentication information.

In this embodiment, authentication information such as a secret number and a password are set by a user via the console unit 209. In addition, setting of authentication information can be performed from an information processing apparatus such as the PC 102 which is connected to the MFP 101 via a network. In this fashion, the MFP 101 accepts registration of the authentication information from the PC 102 or via the console unit 209. An "e-mail" 406 is an email address that the user uses for usual work. A "registration method" 407 is for registering whether to perform registration of user information manually or automatically. Here, "auto" means that user information (for example, user name, domain name, and computer name), which is added to a print job received from a host computer and is for the user who is the owner of the print job, is obtained, for example. The MFP 101 then automatically sets the items 401 through 403 described above, based on the user information. In this fashion, user identification information (for example, uid 401 and the like) for the MFP 101 is generated based on the user identification information (for example, user name, and the like) included in the received job. As illustrated by FIG. 4, the generated user identification information is stored in the HDD 204 is associated with authentication information accepted after the generation of the user identification information.

The authentication module 312 performs control for authenticating a user based on the authentication information and the user identification information stored in the HDD 204. When authentication succeeds, login processing is performed, and a predetermined operation screen for a user to use an application such as copy 321, print 322, and "scan and send" 323 is displayed on the display unit of the console unit 209. The authentication module 312 provides a UI (User Interface) for user authentication that uses authentication by the second method described above. A user operation via the UI is accepted, and a comparison is performed with the user information managed by the user management module 311. The UI is provided for each access path, such as one displayed on the console unit 209, and one that is operated by a Web browser after being accessed via a network. The resetting module 313 performs control relating to resetting the secret number and the password of a user which are managed by the user management module 311.

The copy 321, the print 322, and the "scan and send" 323 are examples of applications that operate on the MFP 101. The copy 321 is for performing so-called copying. The print 322 is an application for holding a print job inputted from the PC 102, displaying a list of jobs inputted by a user who has logged in, and printing after confirming details of the user. The "scan and send" 323 transmits image data, which is obtained by the scanner 211 scanning, externally, such as by email, for example.

Here, as methods for registering and editing user information, the user authentication module 310 provides automatic registration that uses user information included in a print job received from a PC or the like, in addition to typical methods such as input from a UI or import of user information.

Figure 5:
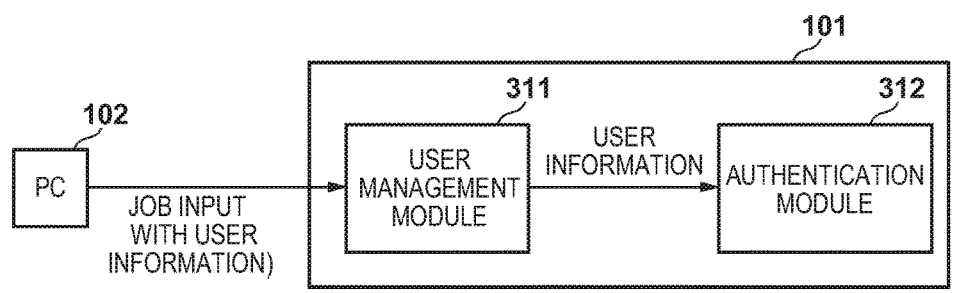
FIG. 5 depicts a view for describing an overview of processing for registering user information from a print job inputted from a PC according to the embodiment.

FIG. 5 depicts a view for describing an overview of processing for registering user information from a print job inputted from the PC 102 according to the embodiment.

A print job inputted here includes user information (user name, domain name, PC name). The user management module 311 that receives a print job conveys the user information to the authentication module 312 before the hold printing processing. The authentication module 312 extracts the uid, domain, PC name, and the like from the user information and registers them to the table (FIG. 4) described above.

Figure 6:
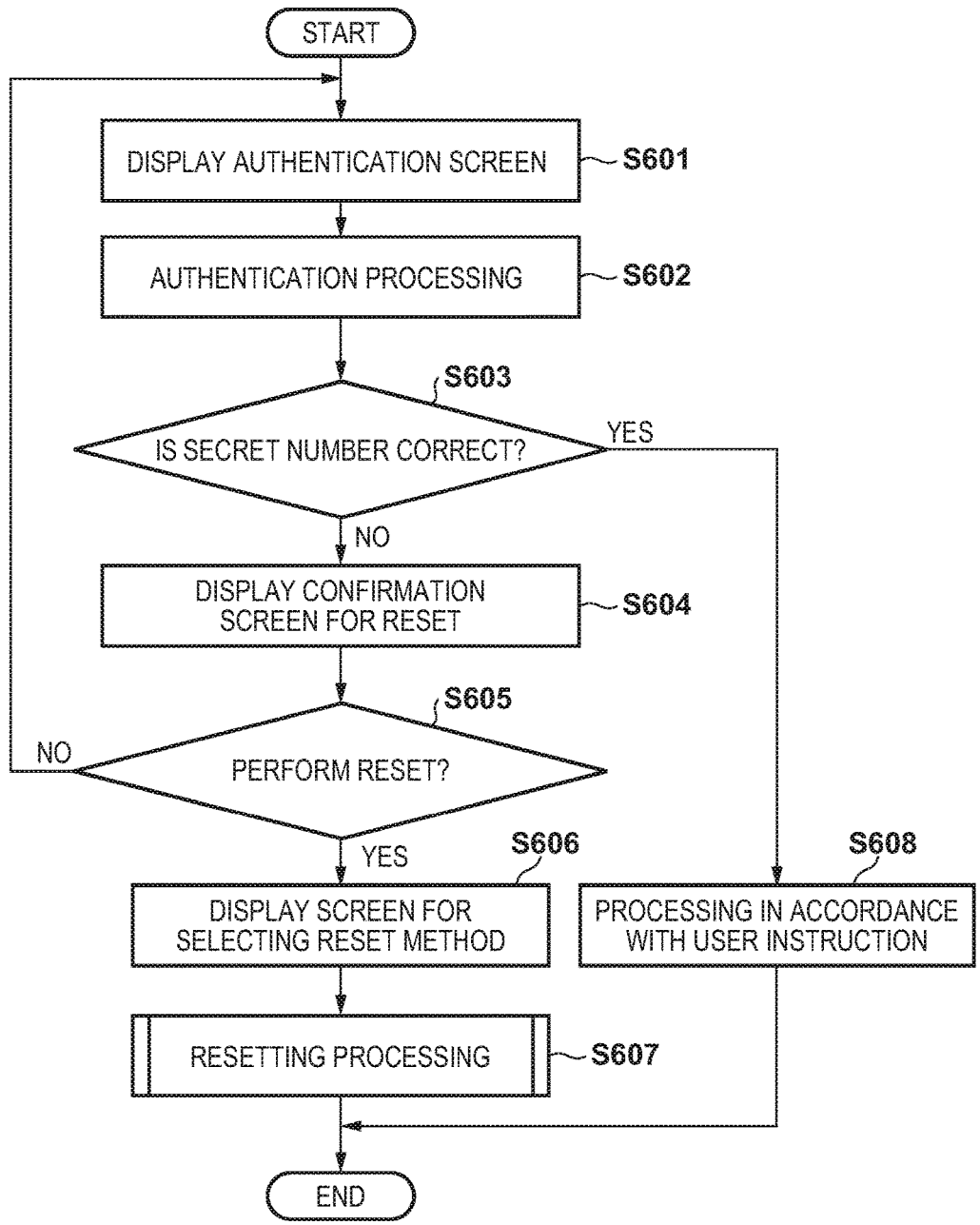
FIG. 6 is a flowchart for describing a flow of processing, when a user has failed at authentication, for resetting a secret number for the user, in the MFP according to the embodiment.

FIG. 6 is a flowchart for describing a flow of processing, when a user has failed at authentication, for resetting a secret number for the user, in the MFP 101 according to the embodiment. Note that the processing described in this flowchart is achieved by the CPU 201 executing a program that has been deployed to the RAM 203.

Firstly, in step S601, the CPU 201 displays on the display unit of the console unit 209 a screen for allowing selection of a user, for example the screen illustrated on FIG. 7A, who is managed by the user management module 311.

FIG. 7A depicts a view illustrating an example of a user selection screen for allowing a user to select a user.

In the MFP 101 according to the embodiment, icons corresponding to each user, as in FIG. 7A for example, are caused to be displayed on the display unit of the console unit 209, and when a user presses their own icon, an operation screen (a screen for after login) that is customized for the user is displayed. This function is referred to as a simple login function below. Information to be displayed is not limited to icons, and a display format does not matter if there is information for selecting a user. With the simple login function, there is a function for automatically registering a logged-in user. This automatic registration function is a function for automatically registering, as a user of the simple login function, a user corresponding to a user ID included in a job, when the job is inputted to the MFP 101 from the PC 102, for example. When a user is newly registered in this way, an icon for the newly registered user is displayed in the list of user icons for the simple login function.

Here, buttons for the user names of "Tanaka", "Kikuchi", and "Suzuki" are displayed, and a user selects the button for their own name from these.

Figure 7B:
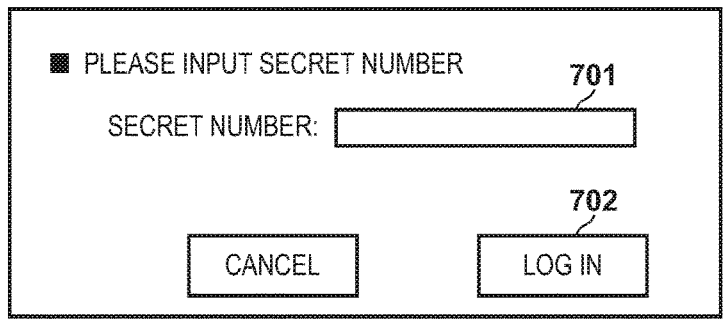

In step S601, when the user name is selected, the processing proceeds to step S602 and the CPU 201 displays a screen as illustrated in FIG. 7B, for example, on the display unit of the console unit 209.

FIG. 7B depict a view illustrating an example of a screen for a user to input a secret number.

Here, the user inputs a secret number in a secret number input field 701, and presses a login button 702. By this, the CPU 201 executes authentication processing for the user based on the inputted secret number.

The processing proceeds to step S603, and the CPU 201 determines whether or not this is a secret number that corresponds to the user, in other words whether or not the secret number is correct. Upon determining that the secret number is correct, the processing proceeds to step S608, login for the user is permitted, and processing is performed thereafter with the user in a logged-in state. Description of an overview of this processing is omitted here.

Meanwhile, when the CPU 201 determines in step S603 that the secret number inputted in the screen of FIG. 7B is not a secret number that corresponds to the user, the processing proceeds to step S604. In step S604, the CPU 201 displays a screen as illustrated by FIG. 7C, for example.

Figure 7C:
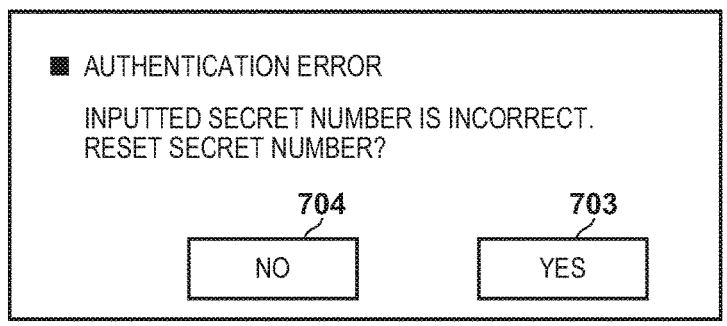

FIG. 7C depicts a view illustrating an example of a screen, displayed when authentication of the user fails, for confirming with the user whether or not to perform a reset of the secret number. A reset of the secret number includes deleting the secret number stored in association with the uid 401 of the user who failed at authentication, and setting the uid 401 to a state where a secret number is not associated. A new secret number can be set by the user performing manual input after deletion of the old secret number. Alternatively, configuration may be taken to delete the secret number stored in association with the uid 401 of the user who failed at authentication, and automatically setting a new secret number. By instructing a reset of the secret number in this fashion, the user can disable the secret number that they are currently using.

Here, a message that the secret number that the user inputted was incorrect is displayed, and the user is allowed to select whether or not to reset the secret number. When the user presses a "YES" button 703 here, the processing proceeds from step S605 to step S606, and when they press a "NO" button 704, the processing returns to step S601 from step S605. In step S606, the CPU 201 displays on the display unit of the console unit 209 a screen for allowing the user to select a reset method for the secret number as illustrated in FIG. 7D, for example.

Figure 7D:
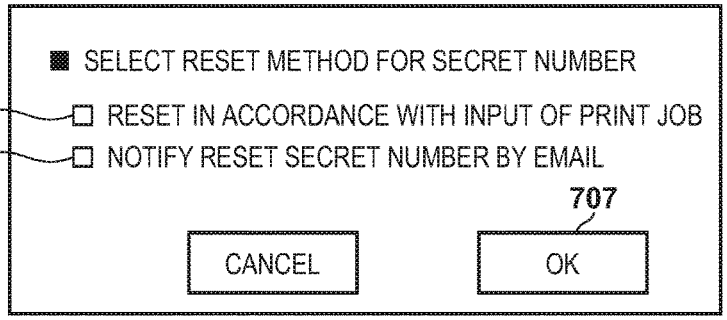

FIG. 7D depicts a view illustrating an example of a screen for allowing the user to select the reset method for the secret number in step S606.

The screen of FIG. 7D includes a radio button 705 for making an instruction to reset the secret number of the user based on the user information added to a new print job, in accordance with inputting the print job from the PC 102. Furthermore, the screen includes a radio button 706 for making an instruction to notify the reset secret number by email. The user can specify the reset method for the secret number by marking a check in either radio button 705 or 706 and pressing an OK button 707. Note that detail of the processing for resetting the secret number is described later with reference to the flowcharts of FIG. 8 and FIG. 9.

Note that, in the case that the user is "Tanaka" for example, registration is made in the registration method 407 of FIG. 4 so that registration of user information is performed manually. Accordingly, the radio button 705 and items for selecting reset of the secret number in accordance with input of a print job are not displayed. In other words, reset of the secret number by input of a job cannot be performed.

In addition, in the case of a user for who an email address is not registered in the user information of FIG. 4, the radio button 706 and items for making an instruction so as to notify a reset secret number by email are not displayed because transmission of an email cannot be achieved.

When a method for resetting the secret number is selected in step S606 in this way, the processing proceeds to step S607, and the CPU 201 resets the secret number of the user in accordance with the method selected in step S606.

FIG. 8 is a flowchart for describing processing for resetting (step S607) a secret number in the case where "reset in accordance with input of print job" is selected as a reset method for the secret number, in the MFP 101 according to the embodiment. Note that the processing described in this flowchart is achieved by the CPU 201 executing a program that has been deployed to the RAM 203.

Firstly, in step S801, the CPU 201 adds the user who made an instruction for a reset to a "reset waiting user list". The "reset waiting user list" lists user information for which an instruction for reset of the secret number was performed but reset has not yet completed in practice, and this data is stored in the RAM 203. Next the processing proceeds to step S802, and the CPU 201 waits for receipt of a print job from an external device, for example the PC 102. Upon receiving a print job, the processing proceeds to step S803, and the CPU 201 receives the print job and stores it in the RAM 203. Next the processing proceeds to step S804, and the CPU 201 determines whether or not a user of the received print job is a user who is in the "reset waiting user list". Here, when the user of the received print job is not a user in the reset waiting user list, the processing proceeds to step S808, the received print job is promptly printed, or stored in the HDD 204 in the case of a hold printing, and this processing ends.

Meanwhile, when the CPU 201 determines in step S804 that a user of the received print job is a user who is in the "reset waiting user list", the processing proceeds to step S805. In step S805, the CPU 201 extracts a secret number included in user information included in the received print job, and resets the extracted secret number as the secret number for the user so that the "secret number" 404 corresponding to the user is reset to the extracted secret number. Next, the processing proceeds to step S806, and the CPU 201 deletes user information of the user from the "reset waiting user list". The processing proceeds to step S807, and the CPU 201 deletes from the RAM 203 the print job necessary for reset of the secret number that was received in step S803, and this processing ends.

In the case where authentication of the user failed, when reset of the authentication information is instructed and a job including user identification information of the user who failed at authentication is received, control for disabling the authentication information stored in association with the user identification information of the user and resetting the authentication information of the user with authentication information included in the received job is performed. In this fashion, it is possible to reset the secret number of the user based on the user information included in the received job.

Figure 9:
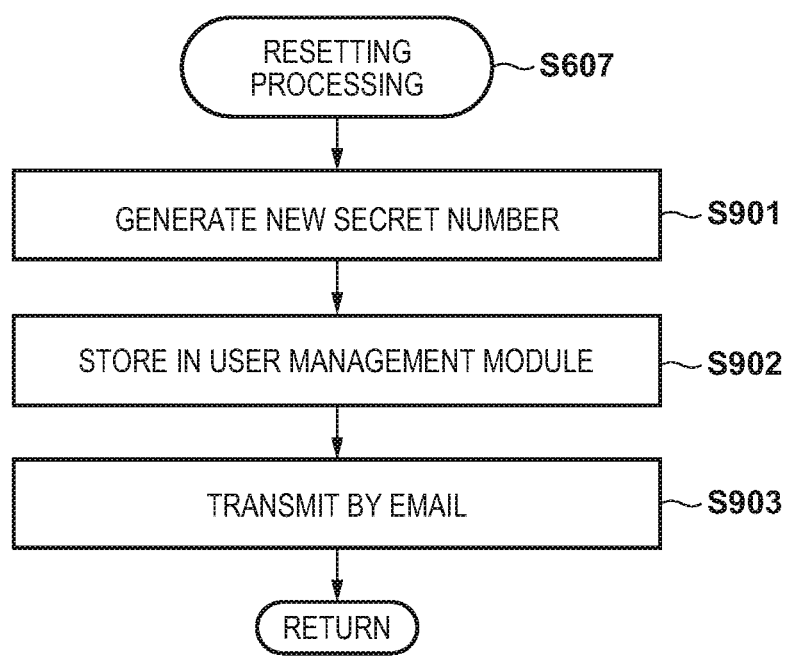
FIG. 9 is a flowchart for describing processing for resetting (step S607) a secret number in the case where "notify reset secret number by email" is selected as a reset method for the secret number, in the MFP according to the embodiment.

FIG. 9 is a flowchart for describing processing for resetting (step S607) a secret number in the case where "notify reset secret number by email" is selected as a reset method for the secret number, in the MFP 101 according to the embodiment. Note that the processing described in this flowchart is achieved by the CPU 201 executing a program that has been deployed to the RAM 203.

Firstly, in step S901 the CPU 201 generates a random value as a new secret number. Next, the processing proceeds to step S902 and the CPU 201 sets the new secret number as the secret number of the user that is managed by the user management module 311 (refer to FIG. 4). Next the processing proceeds to step S903, and the CPU 201 transmits the secret number that was newly set to the "e-mail" address of the user which is managed by the user management module 311.

Consequently, by a newly generated secret number for a user being notified to the user by the MFP 101, the user can use the newly generated secret number to log in to the MFP 101.

In the screen for selecting a reset method for the secret number exemplified in FIG. 7D, "reset of secret number by input of print job" and "notify reset secret number by email" are options. However, because there are cases where a reset function cannot be executed due to the situation, configuration is taken so that a method that cannot be executed is not displayed as an option. Examples of non-display follow.

(1) Reset in Accordance with Print Job Input

If the "registration method" 407 for the user information of the user is not "auto", in other words is "manual", "reset in accordance with input of print job" is not displayed.

Because the case of automatic registration and "reset in accordance with input of print job" both use user information included in a print job, they always match. However, when the registration method 407 is "manual", there is the possibility of no match, and "reset in accordance with input of print job" is not displayed as an option.

A registration method for user information can be set by an administrator or a user in a setting screen as illustrated in FIG. 10. Configuration may be taken to open the setting screen of FIG. 10 only in the case where an administrator is logged in. In the example of FIG. 10, the "registration method" for user information is set to "auto" by inputting a check into a check box 1001 for "automatically register at a time of job input". In contrast, the "registration method" for user information is set to "manual" when a check is not entered in the check box 1001 for "automatically register at a time of job input". In this fashion, the MFP 101 can perform a first setting and a second setting based on a user setting via the setting screen illustrated in FIG. 10. The first setting is for setting whether or not to enable a function for generating the user identification information of the MFP 101 in response to receiving a job. The second setting is for setting, in accordance with reception of a job that includes the identification information of a user who failed at authentication, whether or not to enable a function for disabling authentication information associated with user identification information of the user who failed at authentication.

Note that configuration may be taken such that it is possible to set whether or not to enable "reset in accordance with input of print job" in the setting screen. Furthermore, restriction may be performed so that a setting of "reset in accordance with input of print job" cannot be performed, in accordance with the setting of the "registration method" for user information. For example, configuration may be taken such that, in the setting screen illustrated in FIG. 10, if "automatically register at a time of job input" is not enabled, it is not possible to enable the item for "reset secret number in accordance with job input". The case where "automatically register at a time of job input" is not enabled is the case where the registration method for user information is "manual". In the example of FIG. 10, by graying out a check box 1002 for "permit reset of secret number in accordance with job input", it is possible to set so that the function cannot be enabled. Here, the "permit reset of secret number in accordance with job input" of FIG. 10 means performing the "automatically register at a time of job input" described above. In this fashion, the CPU 201 of the MFP 101 performs control so that the second setting cannot be enabled if the first setting is not enabled.

(2) Notification of Reset Secret Number by Email

When the MFP 101 is not provided with a transmission function, "notify reset secret number by email" is removed from the options because it is not possible to make a notification by email.

In addition, in a case where setting of necessary for transmission of the email such as mail server information is not performed, "notify reset secret number by email" is also removed from the options because it is not possible to make a notification by email.

In a case where the email address "e-mail" is not set in the user information managed by the user management module 311, "notify reset secret number by email" is removed from the options because it is not possible to make a notification by email.

In the login screen after the secret number is reset, there is a possibility that another person will mistakenly perform an operation to reset the secret number. Accordingly, configuration may be taken such that, when the user whose secret number was reset next logs in, a message that the secret number of the user was reset is displayed on an input screen for the secret number exemplified by FIG. 7B.

By this, a user can input the secret number to login after confirming that their own secret number was reset.

Note that description was given in the examples described above by taking the secret number of a user as an example, but there is no limitation to a secret number, and this may be user information unique to a user such as a password, for example.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-130522, filed Jul. 3, 2017, which is hereby incorporated by reference herein in its entirety.

What is claimed is:

1. An image forming apparatus, comprising:
a storage that stores user information;
a memory device that stores a set of instructions; and
at least one processor that executes the instructions stored in the memory device to:
perform an authentication of a user based on accepted user information, with reference to the user information stored in the storage;
allow a user to confirm whether or not to reset the user information, stored in the storage, of the user in a case where the authentication of the user fails;
in a case that it is confirmed by the user to reset the user information stored in the storage, reset the user information of the user, stored in the storage, based on another user information of the user included in a job in accordance with receiving the job including the another user information of the user; and
delete the job including the another user information that is used to reset the user information stored in the storage.

2. The image forming apparatus according to claim 1, wherein the user information includes a secret number or a password, and
wherein the at least one processor executes the instructions in the memory device further to:
in the authentication of the user, display a screen in which the secret number or password is inputted by the user, and
perform authentication of the user based on the information inputted via the screen and the user information stored in the storage.

3. The image forming apparatus according to claim 2, wherein the at least one processor executes the instructions in the memory device further to:
after the reset of the user information of the user, display on the screen information indicating that the secret number or password has been reset.

4. A method of controlling an image forming apparatus having a storage operable to store user information, the method comprising:
performing an authentication of a user based on accepted user information, with reference to the user information stored in the storage;
allowing a user to confirm whether or not to reset the user information, stored in the storage, of the user in a case where the authentication of the user fails;
in a case that it is confirmed by the user to reset the user information stored in the storage, resetting user information of the user stored in the storage based on another user information of the user included in a job in accordance with receiving the job including the another user information of the user; and
deleting the job including the another user information that is used to reset the user information stored in the storage.

5. An image forming apparatus, comprising:
a memory device that stores a set of instructions; and
at least one processor that executes the instructions stored in the memory device to:
receive a job;
generate user identification information of the image forming apparatus based on user identification information included in the received job;
accept authentication information associated with the generated user identification information;
store the generated user identification information of the image forming apparatus and the accepted authentication information in association in a storage;
perform control for authentication of a user based on the user identification information and the authentication information stored in the storage;
in a case that the authentication of the user succeeds, cause a display unit to display a predetermined operation screen for the user to operate the image forming apparatus;
in a case where the authentication of the user fails, when reset of the authentication information is instructed and a job including another user identification information of the user who failed authentication is received, perform control to disable the authentication information stored in association with the user identification information of the user who failed authentication;
perform a first setting for setting whether or not to enable a function for generating the user identification information of the image forming apparatus in response to receiving the job;
perform a second setting for setting, in accordance with reception of a job that includes identification information of the user who failed at authentication, whether or not to enable a function for disabling authentication information associated with the user identification information of the user who failed the authentication; and
in a case that the first setting is not enabled, control to disable to set the second setting.

6. A method of controlling an image forming apparatus, the method comprising:
receiving a job;
generating user identification information of the image forming apparatus based on user identification information included in the received job;
accepting authentication information associated with the generated user identification information;
storing the generated user identification information of the image forming apparatus and the accepted authentication information in association in a storage;
performing control for authentication of a user based on the user identification information and the authentication information stored in the storage;
in a case that the authentication of the user succeeds, causing a display unit to display a predetermined operation screen for the user to operate the image forming apparatus;
in a case where the authentication of the user fails, when reset of the authentication information is instructed and a job including another user identification information of the user who failed authentication is received, disabling the authentication information stored in the storage in association with the user identification information of the user who failed the authentication;
performing a first setting for setting whether or not to enable a function for generating the user identification information of the image forming apparatus in response to receiving the job;
performing a second setting for setting, in accordance with reception of a job that includes identification information of the user who failed the authentication, whether or not to enable a function for disabling authentication information associated with the user identification information of the user who failed the authentication; and in a case that the first setting is not enabled, controlling to disable to set the second setting.

7. A non-transitory computer-readable storage medium storing a computer program for causing a computer to execute steps of a method of controlling an image forming apparatus including a storage operable to store user information, the method comprising:

performing an authentication of a user based on received user information, with reference to the user information stored in the storage;

allowing a user to confirm whether or not to reset the user information, stored in the storage, of the user in a case where the authentication of the user fails;

in a case that it is confirmed by the user to reset the user information stored in the storage, resetting user information of the user stored in the storage based on another user information of the user included in a job in accordance with receiving the job including the another user information of the user; and deleting the job including the another user information that is user to reset the user information stored in the storage.

8. A non-transitory computer-readable storage medium storing a computer program for causing a computer to execute steps of a control method for an image forming apparatus, the control method comprising:

receiving a job;

generating user identification information of the image processing apparatus based on user identification information included in the received job;

accepting authentication information associated with the generated user identification information;

storing the generated user identification information of the image forming apparatus and the accepted authentication information in association in a storage;

performing control for authentication of a user based on the user identification information and the authentication information stored in the storage;

in a case that the authentication of the user succeeds, causing a display unit to display a predetermined operation screen for the user to operate the image forming apparatus;

in a case where the authentication of the user fails, when reset of the authentication information is instructed and a job including another user identification information of the user who failed authentication is received, disabling the authentication information stored in the storage in association with the user identification information of the user who failed authentication;

performing a first setting for setting whether or not to enable a function for generating the user identification information of the image forming apparatus in response to receiving the job;

performing a second setting for setting, in accordance with reception of a job that includes identification information of the user who failed at authentication, whether or not to enable a function for disabling authentication information associated with the user identification information of the user who failed the authentication; and in a case that the first setting is not enabled, controlling to disable to set the second setting.

\* \* \* \* \*